United States Patent [19]

Hammer et al.

[11] 4,233,341

[45] Nov. 11, 1980

[54] PROCESS FOR PREPARING PACKAGING MATERIAL SUITABLE FOR SAUSAGE CASINGS AND ARTICLES MANUFACTURED THEREFROM

[75] Inventors: Klaus-Dieter Hammer, Mainz; Günter Gerigk, Oberursel; Wolfgang Klendauer, Wiesbaden, all of Fed. Rep. of Germany

[73] Assignee: Hoechst Aktiengesellschaft, Frankfurt am Main, Fed. Rep. of Germany

[21] Appl. No.: 668,973

[22] Filed: Mar. 22, 1976

[30] Foreign Application Priority Data

Mar. 24, 1975 [DE] Fed. Rep. of Germany ....... 2512994

[51] Int. Cl.² .................... B29D 9/08; A22C 13/02
[52] U.S. Cl. .................... 427/230; 138/118.1; 206/802
[58] Field of Search .................... 427/230, 390 E; 206/DIG. 802; 426/105, 135; 138/118.1; 428/36, 508, 510

[56] References Cited

U.S. PATENT DOCUMENTS

| | | | |
|---|---|---|---|
| 2,042,589 | 6/1936 | Church | 427/390 |
| 2,748,027 | 5/1956 | Meler | 427/390 |
| 2,999,757 | 9/1961 | Shiner | 426/105 |
| 3,108,017 | 10/1963 | Messwarb | 427/230 |
| 3,886,979 | 6/1975 | Rasmussen | 138/118.1 |
| 3,887,713 | 6/1975 | Voo | 428/36 X |

FOREIGN PATENT DOCUMENTS

| | | | |
|---|---|---|---|
| 628361 | 10/1961 | Canada | 427/390 |
| 1201830 | 8/1970 | United Kingdom | 427/230 |

*Primary Examiner*—Sam Silverberg
*Attorney, Agent, or Firm*—Schwartz, Jeffery, Schwaab, Mack, Blumenthal & Koch

[57] ABSTRACT

Disclosed is a packaging material suitable for manufacturing synthetic sausage casings, comprised of a cellulose hydrate base layer, an optional adhesive layer and a layer of a vinylidene chloride-containing copolymer, as well as several methods for preparing the packaging material and sausage casings therefrom.

24 Claims, 3 Drawing Figures

PROCESS FOR PREPARING PACKAGING MATERIAL SUITABLE FOR SAUSAGE CASINGS AND ARTICLES MANUFACTURED THEREFROM

BACKGROUND OF THE INVENTION

The present invention relates to packaging material, preferably in the form of tubes, suitable for the manufacture of sausage casings and to a process for preparing such material. More especially, the invention relates to the production of tubes having a base layer principally of regenerated cellulose and having a strongly adhering surface layer, preferably on the inside of the tube, which is comprised of a vinylidene chloride-containing copolymer and is substantially impermeable to water vapor, oxygen and flavor substances. Furthermore, the invention pertains to synthetic sausage casings as well as to shirred tubing produced from the packaging material for use in sausage manufacture.

Tubes made of the package material according to the invention are particularly well suited for the manufacture of shirred sausage casings which find utility in the sausage manufacturing industry and as synthetic sausage casings.

Tubes which are commercially utilized as synthetic sausage casings are those based upon cellulose hydrate and these tubes generally have on either their inside or outside surface as coating layer of a vinylidene chloride-containing copolymer. These tubes are available either as rolls or as individual units having one end already closed up. Cellulose hydrate tubes which are suitable for use as synthetic sausage casings and which do not contain any barrier layer coating on their surface have for many years been gathered up or shirred by means of machines which are suitable and well known for this procedure. The procedure is carried out by pleating the tubes in a longitudinal direction into hollow rod-shaped structures. These structures shall be referred to hereinafter as shirred casings. The procedure for producing the shirred casings is known under the designation of shirring or gathering.

These shirred casings are then filled with a sausage mixture by means of any known type of sausage filling machine, wherein the sausage filling recipe is stuffed into the shirred casing which is closed at one end, whereby the shirred casing is continuously unfolded and extended.

It is not possible, however, to carry out this rational process with the known types of tubes which are made from cellulose hydrate and which have a barrier layer coating formed from a polyvinylidene chloride-containing copolymer, since tubes of this type may not be gathered or shirred without causing damage to the shirred casings. In particular, these tubes are not capable of withstanding the strong mechanical stresses which are caused during the shirring procedure. Mechanical stress on the tube takes place above all in the area of the creases produced at the fold in the tube during production of the shirred casings. In these regions, the coating on the tube is damaged. This leads to an uncontrollable and undesirably high permeability of the coating with respect to water vapor, oxygen and also flavor substances, as a result of which the stability and the quality of the sausage are influenced considerably in a disadvantageous manner. Experience shows that the disadvantageous effect of the mechanical action during shirring with this type of tubes generally does not begin immediately after the shirring procedure, but instead renders its effect only after the passage of some time following the processing step.

SUMMARY OF THE INVENTION

It is therefore an object of the present invention to provide an improved packaging material suitable for the production of synthetic sausage casing, which material is based primarily upon cellulose hydrate and contains a barrier layer coating of a vinylidene chloride-containing copolymer which is sufficiently impermeable to water vapor, oxygen and also flavor substances.

It is also an object of the present invention to provide tubes made of this improved packaging material which are capable of being subjected to shirring in preparation as synthetic sausage casings.

A particular object of the invention resides in providing such tubes wherein the coating layer will not break or leak, even after lengthy periods of storage as a result of being subjected to the shirring procedure.

It is a further object of the present invention to provide a method for producing the improved packaging material referred to above as well as for producing the aforementioned improved tubing based upon this packaging material.

Yet, another object of the present invention resides in the provision of improved synthetic casings made from the improved packaging material.

In accomplishing these objects, there has been provided in one embodiment according to the present invention a packaging material suitable for fabricating sausage casings, comprising a base layer comprised of cellulose hydrate, an intermediate adhesive layer comprising a synthetic organic material and a surface layer comprising a vinylidene chloride-containing copolymer containing from about 86 to 90% by weight of vinylidene chloride, and from about 10 to 14% by weight of a mixture of copolymerizable monomers comprised of an $\alpha$, $\beta$-unsaturated carboxylic acid selected from the group consisting of acrylic acid, methacrylic acid, and mixtures thereof; an ester of said carboxylic acid selected from the group consisting of acrylic acid esters, methacrylic acid esters and mixtures thereof; and acrylonitrile. Most preferably, the vinylidene chloride-containing copolymer comprises from about 86 to 90% by weight of vinylidene chloride, from about 1 to 5% by weight of the $\alpha$, $\beta$-unsaturated carboxylic acid, from about 0.3 to 4% by weight of the ester and from about 1 to 8% by weight of acrylonitrile.

According to another embodiment of the invention, there is provided a packaging material suitable for fabrication of sausage casings comprising a base layer comprised of cellulose hydrate, and a surface layer comprised of a vinylidene chloride-containing copolymer comprising from about 84 to 92% by weight of vinylidene chloride and from about 8 to 16% by weight of a mixture of copolymerizable monomers comprising an $\alpha$, $\beta$-unsaturated carboxylic acid selected from the group consisting of acrylic acid, methacrylic acid and mixtures thereof; and an ester of the carboxylic acid selected from the group consisting of acrylic acid esters, methacrylic acid esters and mixtures thereof, wherein a major proportion of the copolymerizable monomers is comprised of the ester component. As a modification of this embodiment, the vinylidene chloride-containing mixture of copolymers is comprised of a first copolymer and a second copolymer in a weight ratio between about 1:1 and 4:1, the first vinylidene chloride-containing copolymer comprising about 90% by weight vinylidene chloride, 1% by weight acrylic acid and about 9% by weight acrylic acid methyl ester and the second vinylidene chloride-containing copolymer comprising about 85% by weight vinylidene chloride, about 2% by weight acrylic acid, about 6% by weight acrylic acid methyl ester and about 7% by weight acrylic acid butyl ester.

In accordance with yet another aspect of the present invention, there has been provided a process for the preparation of a sausage casing from the packaging material first defined above, comprising the steps of coating the inside surface of a tube comprised of cellulose hydrate with an adhesive priming layer of an organic, synthetic material; applying to the primed inside surface a layer of a vinylidene chloride-containing copolymer comprised of from about 86 to 90% by weight of vinylidene chloride and from about 10 to 14% by weight of a mixture of copolymerizable monomers comprised of an α, β-unsaturated carboxylic acid selected from the group consisting of acrylic acid, methacrylic acid and mixtures thereof, an ester of said carboxylic acid selected from a group consisting of acrylic acid esters, methacrylic acid esters and mixtures thereof; and acrylonitrile; adjusting the moisture content of the coated tube to a predetermined value; aging the tube for a period of at least about 3 days; and longitudinally gathering the aged tube to produce a shirred tube.

Also provided according to the invention is a process for the preparation of a sausage casing from the second packaging material defined above, comprising the steps of: coating the inside surface of a tube comprised of cellulose hydrate with a surface layer of a vinylidene chloride-containing copolymer, the cellulose hydrate being in a gelled condition and the vinylidene chloride-containing copolymer being applied directly to the inside surface in the form of an aqueous dispersion, the copolymer comprising from about 84 to 92% by weight of vinylidene chloride and from about 8 to 16% by weight of a mixture of copolymerizable monomers comprised of an α, β-unsaturated carboxylic acid selected from the group consisting of acrylic acid, methacrylic acid and mixtures thereof, and an ester of the carboxylic acid selected from the group consisting of acrylic acid esters, methacrylic acid esters and mixtures thereof, a major portion of said monomer mixture being comprised of the ester; adjusting the water content of one coated tube to a predetermined value; aging the coated tube; and gathering the aged tube to form a shirred tube.

Other objects, features and advantages of the present invention will become apparent from the detailed description of preferred embodiments which follows, when same is considered together with the drawings attached hereto.

DETAILED DESCRIPTION OF PREFERRED EMBODIMENTS

The designation "tubes comprised of regenerated cellulose" is to be considered as including within its definition both those tubes which are comprised of cellulose hydrate and a quantitatively small portion of secondary, chemical plasticizer, such as glycol, glycerin or polyglycol, or water, as well as those which are prepared essentially from a product which results when cellulose hydrate is permitted to chemically react with alkylamine- and/or alkylamidebisdimethylene-triazinone-tetramethylol, in particular, stearylamine- or stearylamide-bisdimethylene-trizainonetetramethylol. Reaction products of this type from cellulose hydrate and alkylamine- and/or alkylamide-bisdimethylene-triazinone-tetramethylol as well as tubes made therefrom and a method for producing same are described in more detail in U.S. patent application Ser. No. 533,452, the disclosure of which is hereby incorporated by reference into the disclosure of the present application.

Tubes which are comprised quantitatively of a major proportion of the aforementioned chemical reaction product and of water as well as, optionally, of secondary chemical plasticizers of the above-mentioned type as a quantitatively minor proportion thereof can also be employed according to the invention. The aforesaid tubes comprised of cellulose hydrate likewise possess according to a preferred embodiment of the invention a fibrous reenforcing insert embedded in the wall thereof, which advantageously is formed from a paper fiber web. In the description which follows, the shortened designation "tube" will also be utilized to designate the above-defined tube comprised of cellulose hydrate.

Within the framework of the following description, there is to be understood under the term "strongly anchored coating" such a coating which neither comes off of its base layer by itself norfollowing treatment of the tube for 20 hours in boiling water, as well as such a coating which is separable from the sausage filling after contact therewith, without causing any damage or destruction to either the coating layer or its base layer.

A coating with satisfactory barrier layer properties is characterized in that it possesses a water vapor permeability of at most 2 g/m$^2$·24 h and an oxygen permeability of at most 16 cm$^3$/m$^2$·24 h· bar, and which is essentailly impermeable to flavor substances.

The two layers of the laminated packaging material (i.e., the cellulose hydrate base and the coating layer of a vinylidene chloride-containing copolymer) possess as a result of their respective chemical formulation physical characteristics, in particular surface tension values, which are so different from one another that a strong bond of the layers is achievable only as a result of special measures during the manufacture of the coated tube, which measures lead to an end product of the process having a unique layer structure. This is possible through the use of two differing coating processes.

It is to be noted that the coating on the tube does not break in the area of the creases either during or immediately following the gathering procedure in the case of forming a shirred casing from a tube having a barrier layer coating, but instead the breaking occurs only after a considerable period of storage of the shirred casing. Immediately following application of the coating layer to the tube, the barrier layer holds up at first without any defects. However, after a short storage period of the shirred casing, the coating layer breaks at those points which have been stressed the most, namely, in the region of the creases in the tube which has been gathered to form a shirred casing. The reason for this can be sought in a change of the material which occurs only after the coating procedure. Both the cellulose hydrate forming the tube itself as well as the vinylidene chloride-containing copolymer forming the coating layer thereon have not yet reached their final physical structure directly following the coating of the tube with the copolymer and drying the resulting structure. Both the cellulose hydrate and also the vinylidene chloride-containing copolymer coating begin to crystallize, which is manifested in a solidification, strengthening and decrease in elasticity of the material.

If the tube provided on its innerside with a barrier layer coating is shirred immediately after the coating procedure, then the structural formation of the cellulose hydrate is not yet advanced far enough so that its structure will be strongly disturbed during the folding procedure which takes place during the gathering process. During further advance of the structure formation, the cellulose hydrate behaves completely differently at these disturbed regions than in the undisturbed region. The cellulose hydrate molecules migrate away from the disturbed areas, and there results accordingly a diminution of the wall thickness, which results in a corresponding decrease in strength and an increase in the stress. During filling of the casing with the sausage material, the tube yields more at these locations in response to the filling pressure corresponding to the increased elasticity of the vinylidene chloride-containing copolymer coating, as a result of which weak points are produced in the coating and the coating is thereby negatively influenced in its function as a barrier layer. In addition, the polyvinylidene chloride-containing coating layer also undergoes a similar change in its structure during storage, because this material also crystallizes and thereby loses its flexibility and elasticity. The tendency toward crystallization is in this regard particularly strong in the case of those types of vinylidene chloride copolymers which exhibit especially good barrier properties as a result of their high content of vinylidene chloride.

CELLULOSE HYDRATE TUBE HAVING AN ADHESIVE LAYER OF SYNTHETIC MATERIAL ON ITS INSIDE SURFACE AND A VINYLIDENE CHLORIDE-CONTAINING COPOLYMER COATING LAYER THEREON, AND PROCESS FOR PREPARING THE TUBE HAVING SUCH A LAYER CONFIGURATION

For carrying out the process for the preparation of the tubes, one begins with tubes which have already been once subjected to drying (water content of approximately 8 to 18% by weight, based upon the total weight of the tube) and which have been provided on their inner surface with a conventional layer of urea-, melamine formaldehyde-, or chlorohydrin-precondensate. This adhesive layer may be applied in the conventional manner, and for this process there may be employed conventional aqueous solutions of the foregoing precondensates, which are applied to the surface of the dried tube. Subsequently, the solvent is removed from the coating layer by the application of heat.

By means of this adhesive priming layer, the high surface tension of the strongly polar cellulose hydrate is reduced to such an extent that the vinylidene chloride-containing copolymers bond sufficiently strongly as a result of the purely adhesion forces. The bonding is in this regard consistently better as the proportion of polar component in the copolymer is increased. Vinylidene chloride-containing copolymers are suitable for use as the coating to be applied to the adhesive priming layer on the inside of the tube. These copolymers are produced by copolymerization of mixtures of polymerizable monomers, which contain between about 86 and 90% by weight of vinylidene chloride and from about 10 to 14% by weight of a mixture comprised of an $\alpha$, $\beta$-unsaturated carboxylic acid selected from the group consisting of acrylic acid, methacrylic acid and mixtures thereof; an ester of an $\alpha$, $\beta$-unsaturated carboxylic acid selected from the group consisting of acrylic acid esters, methacryclic acid esters and mixtures thereof (preferably acryl esters thereof); and acrylonitrile, wherein the mixture contains a major quantitative portion of acrylonitrile and a minor quantitative portion, preferably a small portion of the ester components. The foregoing weight percentage values are based respectively upon the total weight of the mixture of polymerizable monomers. The aforementioned esters are chemical reaction products of acrylic acid and/or methacrylic acid, preferably with aliphatic, mono-functional alcohols having from 1 to 12 carbon atoms (either primary, secondary or tertiary alcohols), and most preferably the alcohol is selected from the group of methyl alcohol, ethyl alcohol, propyl alcohol and butyl alcohol.

Particularly suitable as the coating layer upon the adhesive priming layer on the surface of the tube is a copolymer which is comprised of from about 86 to 90% by weight vinylidene chloride, from about 1 to 5% by weight of acrylic acid and/or methacryclic acid, from about 0.3 to 4% by weight of acrylic acid ester and/or methacrylic acid ester, and from about 1 to 8% by weight of acrylonitrile. The methyl esters of the aforementioned acids are preferred in this regard. Polymers of this type are produced by copolymerization of a mixture of the specified monomers, and the monomer mixture contains the respective monomers in amounts which likewise characterize the content of the respective units in the copolymer.

Especially perferred is a copolymer which is comprised of about 88% by weight of vinylidene chloride, about 3% by weight acrylic acid, about 1.5% by weight of acrylic acid methyl ester and about 7.5% by weight of acrylonitrile. A copolymer of this preferred type is produced by copolymerization of a mixture of the specified monomers that contains the respective monomers in the amounts which are likewise characteristic for the copolymer produced. The weight percent values referred to above are based respectively on the total weight of each copolymer and also upon the total weight of the mixture of copolymerizable monomers.

It is one essential feature of the present invention that the aforementioned copolymers are characterized by the following crystallization parameters:
Refractive Index:

at 40° C. = 1.5942
at 60° C. = 1.5951
at 80° C. = 1.5964.

For the measurement of the refractive index, an extruded film is prepared from an aqueous dispersion of the copolymer to be investigated. In this procedure, the respective dispersion is extruded onto a glass plate and then heat is applied to the fluid layer, which removes the dispersing liquid from the extruded layer. The self-supporting copolymer film prepared in this manner is then stripped from the support. Samples of the film are then exposed each for 30 minutes to heat at a temperature of 40° C., 60° C., and 80° C. After cooling the samples to room temperature, the refractive index of each is measured in conventional fashion utilizing the usual refractometer.

Figure 3:
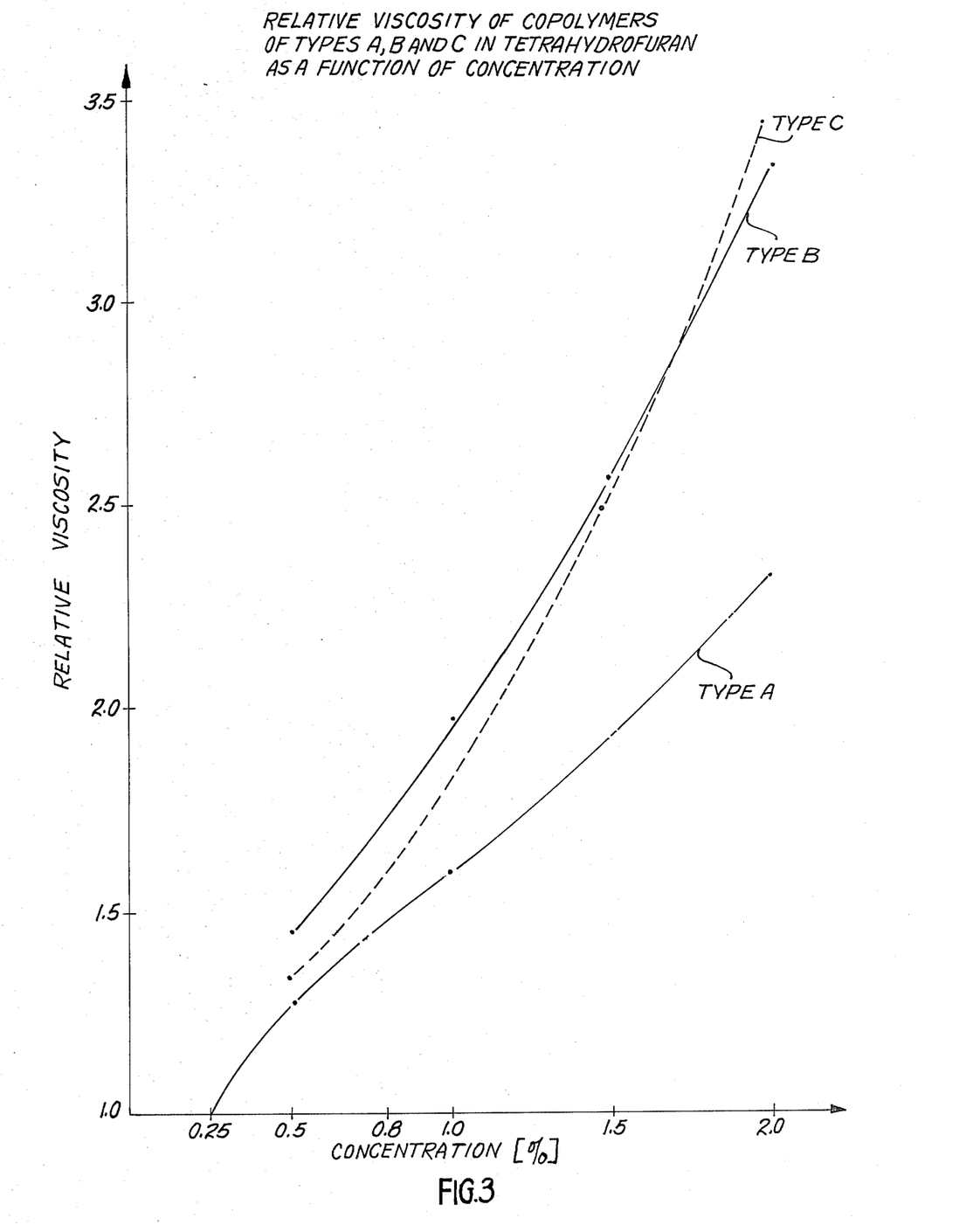
FIG. 3 is a graphical plot of the relationship of relative viscosity of the copolymers according to the invention as a function of concentration when they are dissolved in tetrahydrofuran.

The concentration dependence of the specific viscosity of a solution of the preferred copolymers in tetrahydofuran is illustrated by the curve A in FIG. 3 of the drawings.

The quantitatively large portion of polar groups in the copolymer favorably affects the bonding thereof to the cellulose hydrate surface of the tube which has been prepared with a bonding layer of the above-mentioned composition. The high proportion of polar groups in the copolymer also causes, however, the result that a transparent coating of this material is relatively, considerably darkened or cloudened when contacted with hot water.

For coating the inside surface of the previously prepared, once dried (water content approximately 8 to 18% by weight, based upon the total weight of the tube) cellulose hydrate tube, there is utilized an aqueous copolymer dispesion which contains an amount of the above-mentioned, surface layer-forming copolymers in the range of about 4 to 8% by weight, preferably between about 5 and 7% by weight, based upon the total weight of the dispersion. It is possible to produce dispersions having a suitable copolymer concentration by simply diluting with water corresponding copolymer dispersions of higher concentrations. The aqueous copolymer dispersions advantageously contain one or more emulsifiers in an amount typically in the range between about 0.3 and 10% by weight, based upon the weight of the dispersions. Any of the conventional emulsifying agents for preparing vinylidene chloride-containing copolymers may be employed and typical, suitable dispersing agents are alkyl-, aryl-, alkyl-aryl-sulfonates and -sulfates.

Coating of the inside surface of the cellulose hydrate tube with the adhesive priming composition as well as application of the aqueous polymer dispersion upon the priming area is carried out in accordance with conventional technology, for example, that which is described in British patent Specification No. 1,201,830. After drying of the coating by the application of heat, the tube is then adjusted to a water content of between about 16 and 18% by weight, based upon the total weight of the tube, by sprinkling with water.

The thickness of the coating on the inside of the tube is readily adjusted and controlled by appropriate choice of the polymer dispersion employed as well as by maintaining appropriate processing parameters. The coating of the vinylidene chloride-containing copolymer has a thickness which corresponds to the weight in the range of between about 4 and 15 g/m$^2$, preferably an amount of from about 8 to 12 g/m$^2$ of the coated surface of the tube. This coating has an elasticity of between about 12 and 20%, measured on a self-supporting film of the same strength, which is prepared in the conventional manner by extrusion of an aqueous dispersion comprised of the aforementioned vinylidene chloride-containing copolymer.

If after application of the adhesive-producing intermediate layer on the inside of the cellulose hydrate tube and after drying same, a storage period of at least 3 days is observed, i.e., before the surface coating of vinylidene chloride-containing copolymer is applied to the adhesive of the tube, and then after applying the surface coating the tube is once again subjected to a storage period of at least 3 days and only after expiration of this period is subjected to the gathering process to produce a shirred tube, the resulting shirred tube can be stored for whatever length of time is desired, without experiencing any breaking of the coating layer in the regions of the creases produced in the shirred tube.

The above-described tubes are typically characterized by a secondary plasticizer content in the range from about 15 to 30% by weight, preferably in the range of 17 to 28% by weight. Any of the plasticizers conventionally employed for producing cellulose hydrate-based tubes and synthetic sausage casings may be employed. For example, typical exemplary plasticizers include gylcerine and polyglycols. This content of secondary plasticizer is incorporated into the tube in conventional fashion during manufacture thereof.

PREPARATION OF A CELLULOSE HYDRATE TUBE HAVING ITS INSIDE COATED DIRECTLY WITH A STRONGLY-BONDING, TRANSPARENT SURFACE LAYER OF A VINYLIDENE CHLORIDE-CONTAINING COPOLYMER

"Transparent" in this context means that the original transparency of the surface layer is not substantially changed even after long periods of contact (5 to 60 minutes) with hot water (e.g., 80° C.).

In accordance with all of the previously known processes, the coating layer is applied in either one or two layers on the outer surface of the pre-treated and dried (on the outside) celulose hydrate-based tube, and then during the intended use of the tube as a synthetic sausage casing, the sausage preparation is introduced into the uncoated inside of the casing. This has the decisive disadvantage that well-rounded sausages are not obtained in this manner and that the sausage formulation is bound extraordinary strongly to the cellulose hydrate layer. Moreover; the gels and fat separate from the formulation. It has also been proposed to take the casings which have initially been coated on the outside surface and turn them inside out in a complicated and expensive process, so that the surface originally on the outside then becomes the inside surface. However, in practicing this proposal, damage to the coating layer can hardly be prevented. The defects produced in the casing according to this method diminish the storage capability of the sausage formulation and the sausage product, and make the product unsightly.

The terminology "surface coating from a film-forming synthetic copolymer" is to be understood as having the special meaning that for its preparation there is to be employed an aqueous polymer dispersion wherein the dispersed material is capable of forming a film when the liquid dispersion is spread out on a solid support and the dispersing medium removed. At or above the so-called film-forming temperature, the solid particles freed from the dispersing medium are capable of flowing together into a cohesive, continous film. The thus-defined film-forming temperature lies within the range of from about 10° to 30° C., and preferably at a temperature within the range of from about 15° to 28° C. in the case of the vinylidene chloride-containing copolymers preferred for use in accordance with the invention.

The coating layer is flexible, and this means that a self-supporting film of the coating material would exhibit an elasticity of approximately 10%, based upon its original length. The chemical formulation as well as the quantitative composition of the coating layer assures also that it will not become brittle after lengthy periods of storage.

The coating layer has a thickness which corresponds to a weight of from about 3 to 15 grams of the specified copolymers per square meter of tube surface, preferably a weight of about 5 to 10 grams of copolymer per square meter of tube surface.

It is also an important feature of the process according to the present invention that the tube comprised of cellulose hydrate is in a gel condition at the point in time at which the aqueous dispersion of vinylidene chloride-containing copolymer is applied to its inside surface. It is therefore essential according to the invention that the copolymer dispersion be applied during its coating to the surface of the tube while the latter is in a gelled condition, because only under these conditions is there obtained a sufficiently fast and uniform penetration of the dispersed polymer into the surface of the tube wall, which thereby leads to an especially strong anchoring of the coating directly to the tube surface. The gelled condition of the cellulose hydrate-based tube is characterized by a swelling value of a number in the range of from about 290 to 310, whereby this number provides an indication of the water content of the tube, based upon the total weight thereof. The swelling value is determined according to a method which is described in the periodical "Farberei-und textiltechnische Untersuchungen", Hermann Agster, SpringerVerlag, 1956, Page 400.

The term "coating layer adhered directly to the inside of the tube" is to be understood as including such coatings wherein no adhesive intermediate layer of a chemical material is found between the coating layer and the surface of the tube, i.e., the adhesive material does not have a chemical composition different from that of the coating or the material forming the tube.

The coating layer on the inside surface of the cellulose hydrate tube, which coating is produced by application of an aqueous polyvinylidene chloride copolymer dispersion on the tube which is in an gelled condition, does not merely adjoin directly on the surface of the inner wall of the tube, but instead the polymer forming the coating permeates partially into the area adjacent the inside surface of the tube wall and becomes embedded there. As a result of this structural connection between the tube wall and the coating, the strong anchoring of the coating upon the tube surface is produced.

The vinylidene chloride-containing copolymer dispersions utilized for production of the coating layer possess a surface tension in the range of between about 30 and 55, and preferably between about 32 and 40 dyn/cm. The subject aqueous dispersions contain an amount of dispersed polymer in the range of between about 8 and 30% by weight, preferably between about 10 and 16% by weight. Copolymer dispersions of suitable concentration may be prepared from those of higher concentration by simple dilution with water. The aqueous dispersion typically contains an emulsifier, preferably in an amount within the range of from about 0.3 to 10% by weight, based upon the weight of the material dispersed in the dispersion. Any of the emulsifying and dispersing agents conventionally employed for the production of vinylidene chloride-containing copolymers can be employed in the present invention, and exemplary of such suitable agents are alkyl-, aryl-, alkyl-aryl-sulfonates or -sulfates.

The coating layer is comprised of a vinylidene chloride-containing copolymer which comprises from about 84 to 96% by weight of vinylidene chloride and from about 8 to 16% by weight of a mixture of $\alpha,\beta$-unsaturated acid selected from the group consisting of acrylic acid, methacrylic acid and mixtures thereof and an ester of a $\alpha,\beta$-unsaturated carboxylic acid selected from the group consisting of acrylic acid esters, methacrylic acid esters and mixtures thereof, wherein the amount of the ester predominates in the mixture. Acrylic acid esters and methacrylic acid esters are those according to the definition presented hereinabove, namely, esters of acrylic acid or respectively methacrylic acid with aliphatic, monohydrate alcohols having from 1 to 12 carbon atoms, preferably from 1 to 4 carbon atoms.

Especially preferred is a coating layer which is formed from a copolymer comprised of from about 84 to 92% by weight of vinylidene chloride and a mixture comprised of from about 0.5 to 4% by weight of acrylic acid and/or methacrylic acid and from about 9 to 12.5% by weight of an acrylic acid ester and/or methacrylic acid ester. More especially, there is particularly preferred a copolymer which comprises approximately 90% by weight vinylidene chloride, about 1% by weight acrylic acid and about 9% by weight of acrylic acid methyl ester. The above-specified copolymers are prepared by copolymerizing the specified monomers in the relative amounts stated for the composition for the copolymer. The weight percent values given are based respectively upon the total weight of the copolymer and also upon the total weight of the polymerizable monomers.

It is one essential feature according to the invention that the vinylidene chloride-containing copolymers suitable for preparation of the coating layer are characterized, as a result of their molecular weight, by a specific viscosity of a 1% by weight solution of the respective copolymers in tetrahydrofuran of at least 1.8 and a specific viscosity of a 2% by weight solution in tetrahydrofuran of at least 3.0. The molecular weight of the copolymer which is comprised of about 90% by weight vinylidene chloride, about 1% by weight acrylic acid, and about 9% by weight acrylic acid methylester, i.e., that which forms the most preferred coating layer, is characterized by a steep increase of the relative viscosity of a solution of the polymer in tetrahydrofuran as a function of increased concentration of the solution, as illustrated by the curve B in FIG. 3 of the drawings. As a result of this particular molecular weight of the polymers, the crystallization thereof does not exceed a predetermined value, which is characterized by an elasticity of from about 6 to 10% of a layer of this polymer.

The coating has a thickness which corresponds to a weight of from about 3 to 15 grams, and preferably from about 5 to 10 grams of copolymer per square meter of coated tube surface.

If a tube of this kind is subjected to the gathering procedure to form a shirred casing at least 4 weeks after application of the coating layer on its original inside surface, the resulting product can be stored for as long as desired without experiencing any breaking of the coating layer, particularly in the region of the creases formed in gathered tube.

Especially preferred are tubes which have on their original inner surface a coating layer made from a mixture of two copolymer products in a relation of from 1:1 to 4:1 to one another, namely, a first copolymer comprised of from about 90% by weight vinylidene chloride, about 1% by weight acrylic acid and about 9% by weight acrylic acid methyl ester, and a second copolymer comprised of approximately 85% by weight vinylidene chloride, about 2% by weight acrylic acid, about 6% acrylic acid methyl ester and about 7% by weight of acrylic acid butyl ester. Tubes of this type are preferred because the coating layer exhibits an elasticity in the range of between about 15 and 20%. The gathering process for producing shirred tubes proceeds especially well with this type of tubes in view of the foregoing elasticity characteristics of the coating layer. The latter-mentioned copolymer above is characterized by the following crystallization values:
Index of Refraction:
  at 40° C.=1.5711
  at 60° C.=1.5725
  at 80° C.=1.5730.
The measurement of the refractive index is accomplished on a film which is prepared in accordance with the method described hereinabove.

The water vapor permeability of a coating layer of this type lies below 2 g/m$^2$·24 h; its oxygen permeability is less than 20$^3$/m$^2$·24 h·bar. The coating is substantially water impermeable. The tube itself contains an amount of plasticizer in the form of glycerine in the range of about 15 to 27%, preferably between about 17 and 23%; its water content is between about 16 and 18% by weight, based upon the total weight of the tube. Tubes manufactured in accordance with the foregoing principals may be subjected to the gathering process without and damage whatsoever if before gathering, the tubes are permitted to undergo a storage period of at least 4 weeks.

The aqueous copolymer dispersion utilized for preparation of the coating layer advantageously contains a certain amount of plasticizer, such as glycerine, in order to prevent leaching of the plasticizer, preferably in the form of glycerine, present in the tube itself during the course of the coating procedure.

Performance of the process will be described in the following text, whereby for purposes of illustration there will be employed a regenerated cellulose-based tube existing in a gelled condition, which furthermore comprises in its wall structure a matrix of paper fibers.

In a conventional manner, a tube-shaped structure is produced from a paper fiber web by folding the same in a manner so that the longitudinal edges overlap and thereafter bonding the overlapping edges. By means of a conventional tubular extrusion device, the tubular-shaped structure is impregnated with a viscose solution and is provided on both sides with a layer of viscose. The viscose solution used for this purpose comprises a cellulose content of 7.1% by weight, its alkali content is 5.78, it has a $\epsilon$-value of 32.8, a sodium chloride maturity of 3.25 as well as a falling-ball viscosity of 123 seconds and 25° C. The fiberous tube impregnated with viscose is then continually advanced into a precipitating liquid for viscose. Precipitating liquids of this kind are well known in the art and are comprised of aqueous solutions which contain mixtures of sodium sulfate and sulfuric acid.

After application of the precipitating liquid, the tube-shaped form is then conducted in a conventional manner consecutively through a number of conventional regenerating and wash baths, whereby the regenerating baths comprise aqueous solutions which contain mixtures of sulfuric acid and sodium sulfate in graduated proportions. These liquids as well as their composition are well known and do not form any part of the present invention.

Subsequently, an aqueous solution of a conventional chemical agent suitable for plasticizing regenerated cellulose and well known for this purpose is applied to the tube. For example, in this procedure, the tube is led through a container which is filled with a liquid composition which has dissolved therein one or more of these plasticizing agents. The preferred aqueous plasticizer composition comprises a content of plasticizer between about 5 and 20% by weight, and preferably within the range of between about 10 and 15% by weight, based upon the total weight of the plasticizing liquid. As indicated above, any suitable plasticizing agent can be employed, and suitable examples of such agents include glycerine, glycol and polyglycols. Following treatment with the plasticizing liquid, the tube has a plasticizer content within the range of between about 18 and 28% by weight based upon the total weight of the tube.

After application of the aqueous plasticizer formulation to the tube, there is then applied to the inside of the tube, which is present in a gelled condition, a fluid layer of the aqueous copolymer dispersion which has been previously defined in considerable detail. Formation of the coating layer on the inside surface of the tube is carried out in a conventional manner, for example, by means of the steps of a process which is described in British patent Specification No. 1,201,830.

Drying of the tube and of the liquid coating of dispersion on its inner surface is carried out by the application of heat at a temperature in the range between about 90° and 120° C., for example, by passing the tube through a warm air-supplied drying channel, which has a temperature at the entrance between about 540° and 620° C. and a temperature at its exit of from about 200° to 250° C. The tube is passed through the channel at a speed of from about 5 to 15 m/min., preferably, at a speed of between about 6 and 10 m/min. The drying can also be accomplished at lower temperatures, such as about 90° C.; however, this will obviously require longer drying periods. The dried tube has a residual water content of between about 2 and 5% by weight, based upon the total weight of the tube. After exiting from the dryer, the tube is once again brought into contact with water, in order to attain in the tube wall a water content which is necessary for the contemplated utility of the tube. In order to accomplish this, the surface of the tube is sprayed with water, and the application time for the water and the amount of water applied are controlled in such a manner that the tube has a water content of from about 7 to 22% by weight, preferably from about 14 to 16% by weight, based upon its total weight, following the water treatment. The tube manufactured in this manner also has a plasticizer content in the range of between about 18 and 28% by weight, preferably between about 20 and 25% by weight based upon the total weight of the tube.

After a storage period of at least 4 weeks, the tube is subjected in conventional fashion with the use a known device to the shirring process whereupon it is formed into shirred casings. The shirred casings are capable of being stored for practically an unlimited period of time without experiencing breaks in the coating layer of the tube, particularly in the region of the fold creases. A cellulose hydrate tube without fiber reenforcement is prepared having a coating on its inside surface in substantially the same manner.

A further objective of the present invention is seen not only in the attempt to modify the surface coating of the tube comprised of a vinylidene chloride-containing copolymer chemically in a manner so that it is possible to produce shirred tubes which after a short period after their manufacture can be stored for a long period of time without disadvantageous alterations of their properties, but also to modify the tube itself in such a manner that there does not result during the shirring process any disadvantageous alterations which detrimentally alter the properties of the tube and the shirred casings produced therefrom, so that these may be stored over a long period of time following their manufacture. The storage period itself which is required before and/or after the shirring of the tube, which is produced according to one or the other of the process variations according to the present invention, can be considerably shortened if one begins with tubes which are comprised of a major quantitative proportion of internally-plasticized cellulose hydrate. Under the designation "internally plasticized cellulose hydrate" there are to be understood as included those products in connection with which the plasticizing agent is strongly bound to the cellulose hydrate molecule by chemical bonding. In contradistinction thereto, the so-called secondary plasticizers, such as glycerine, glycol or polyglycol are bound to the cellulose hydrate molecule only through inter-molecular forces.

Internally plasticized cellulose hydrate is produced by chemical reaction of cellulose hydrate with from about 5 to 15% by weight, preferably between about 6 and 8% by weight of an alkylamine- or alkylamide-bisdimethylene-triazinone-tetramethanol. Especially preferred reaction components are stearylamine- or stearylamide-bisdimethylene-triazinone-tetramethanol. The amount reacted as set forth above is based upon the amount of cellulose hydrate. When utilizing the chemically modified cellulose hydrate for the preparation of tubes, there result products which require a storage period of from only several hours and up to a maximum of 2 days between the time they are primed with an adhesive layer of the aforementioned type on their inner surface followed by application of a surface layer of the above-designated vinylidene chloride-containing copolymer and the time at which they are subjected to the shirring process. In the case where internally plasticized cellulose hydrate of the foregoing type is subjected to the gathering process to produce shirred casings after being provided directly on its interior surface, which is in a gelled condition, with a coating of the vinylidene chloride-containing copolymer, it is sufficient to provide a storage period of from about 2 to 14 days between the production of this type of tubes having the aforesaid coating and the time of subjecting them to the shirring procedure. This short storage period is sufficient to render the tubes capable of storage for an unlimited period of time without impairment of the above-mentioned type to the shirred casing or the sausages prepared therefrom.

The storage period to be applied is accordingly dependent upon the amount of internal plasticizer utilized, upon the conditions of the preparation and above all upon the factor of whether the tube contains additional, secondary plasticizing agents. In addition to shortening of the storage period, the use of internally plasticized cellulose hydrate as the base for the tubes results in various other advantages. The tube is more flexible and is easier to use in the shirring process. As a result of cross-linking of the cellulose hydrate, the strength of the tube is substantailly increased, without the attendant disadvantage of a decrease in the elasticity. An additional, decisive advantage is that the material likewise does not become brittle if it should happen that the secondary plasticizer is leached from the material during filling of the tube with the sausage component.

By means of the present invention, it is possible to adapt both components of the cellulose hydrate/polyvinylidene chloride copolymer coating layer composite to extraordinarily strong mechanical stresses which occur when tubes made from this composite are subjected to the shirring procedure.

Figure 1:
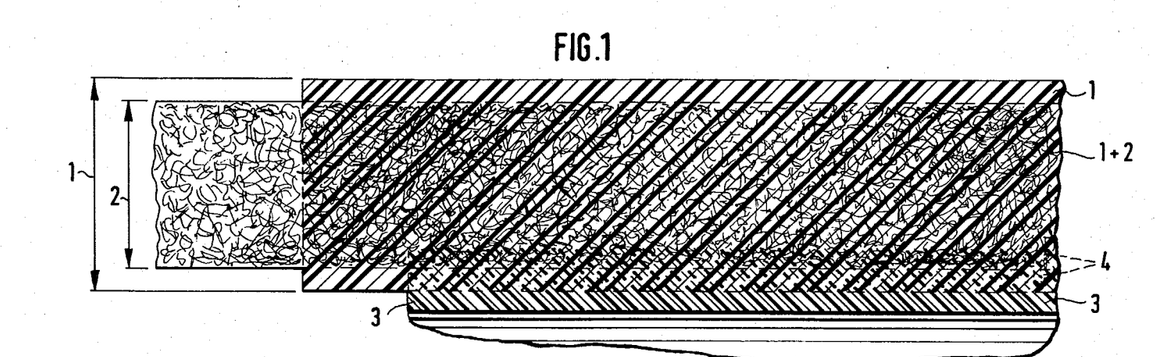
FIG. 1 is a schematic representation in longitudinal cross-section of the wall of a tube produced in accordance with the invention.

Referring now to the drawings, FIG. 1 illustrates in schematic representation and in longitudinal cross section the wall of a tube comprised of chemically modified cellulose hydrate. On the side thereof facing the hollow interior of the tube, there is provided directly adjacent thereto and adhesively bonded thereto a substantially gas impermeable coating layer comprised of a vinylidene chloride-containing copolymer.

Figure 2:
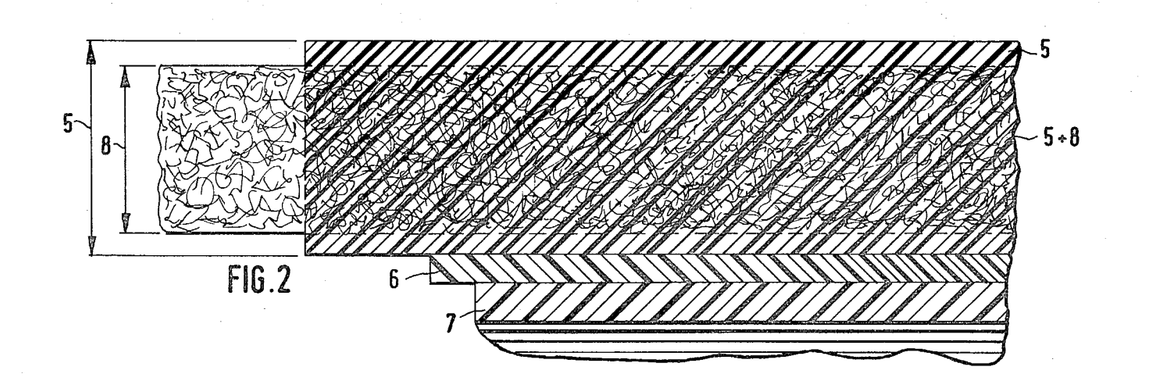
FIG. 2 is a schematic, longitudinal cross-sectional view of the wall of another tube produced according to the invention.

In FIG. 2, likewise schematically and in longitudinal cross section, there is illustrated the wall of a tube which is provided on the side facing the hollow tube interior with an adhesive layer of synthetic material. Upon this adhesive layer there is applied a gas impermeable, securely bonded outer layer comprised of a vinylidene chloride-containing copolymer.

In FIG. 1, the reference numeral one (1) designates the wall of the tube in its totality, the tube wall being comprised of cellulose hydrate, an amount of water and a chemical plasticizer. Reference numeral two (2) designates a fibrous matrix incorporated into the tube wall, and reference numeral three (3) identifies the coating layer on the inner side of the tube wall which is positioned directly on its surface and faces the hollow interior of the tube. The numeral four (4) refers to polymeric material which is impregnated into the region near the surface of the tube wall, and this polymer is identical in its chemical structure and its composition with the polymer which forms the coating layer.

In FIG. 2, the reference numeral five (5) designates the tube wall which is comprised of regenerated cellulose, chemical plasticizer and also water. The reference numeral six (6) represents an adhesive layer of a synthetic material located on the side of the tube wall which is contiguous to the hollow interior space in the tube. Applied upon on this intermediate adhesive layer is a surface coating (7) formed from a vinylidene chloride-containing copolymer, and in the tube wall (5) there is embedded a reenforcing fiber inlay (8).

The following examples are presented to further illustrate the present invention without limiting the same thereto.

EXAMPLE 1

A viscose solution (cellulose content 7.1% by weight based upon the total weight of the solution, alkali content 7.8, $\gamma$-value 32.8, sodium chloride maturity 3.25, viscosity=123 sec. ((falling-ball)) at 25° C.) is utilized for impregnating and coating a tube made of cellulose fibers. Under the term "impregnating" there is to be understood in the present example and in the entire disclosure of the invention, that the fibrous tube is completely imbued by the viscose solution and a continuous layer of the solution is produced on both the inner and the outer side of the tube. This is accomplished by impregnating and coating the fibrous tube with the viscose solution utilizing a conventional tubular extrusion device.

After the viscose-impregnated fibrous tube leaves the coating orifice, a precipitating liquid is applied continuously to the tube. The liquid is comprised of an aqueous solution containing 10% by weight of sulfuric acid, 14% by weight of sodium sulfate, each based upon the total weight of the liquid. The tube is then passed through a succession of baths of conventional composition, however each having a graduated concentration of the respective components. The tube is then subsequently washed with water and thereafter an aqueous plasticizer composition is applied in the form of a 10% by weight aqueous glycerine solution, which is accomplished by continuously passing the tube through a vessel filled with this liquid. The treatment time in the plasticizer composition is adjusted so that the tube contains 22% by weight of glycerine based upon its total weight, following the treatment period. The cellulose tube treated in this manner is in a gelled condition. Its swelling value is 300%. The gelled tube has a diameter of 60 mm. and a wall thickness of 0.3 mm. In the correspondingly long section of the gelled tube, there is introduced 91. of a 19% by weight aqueous dispersion of a copolymer which is comprised of 90% by weight vinylidene chloride, 1% by weight acrylic acid and 9% by weight of acrylic acid methyl ester. The copolymer is characterized by a molecular structure as a consequence of which the specific viscosity of a solution of the same in tetrahydrofuran possesses a particular dependence upon the concentration of the solution. The concentration dependence of the specific viscosity of a 1% by weight solution of the copolymer in tetrahydrofuran corresponds to the curve B illustrated in FIG. 3 of the drawings. The aqueous copolymer dispersion contains in addition 4% by weight of glycerine based upon the total weight and 10 mg. of a silicone antifoaming agent, based upon 100 l. of dispersion.

The glycerine content of the liquid produces the effect that the tube experience a loss of glycerine due to plasticizer migration after application of the aqueous dispersion.

The formation of the coating layer directly on the original inside surface of the tube is accomplished by bringing the inner wall of the tube continuously into contact with the liquid introduced, in accordance with one of the techniques described in British Patent Specification No. 1,201,830. In this manner, a fluid layer of aqueous polymer dispersion is deposited on the inside surface of the entire tube. The tube having its inner surface coated in this fashion is then continuously passed through a drying channel with a speed of approximately 7 m/min. The entrance portion of the channel is at a temperature of 560° C., whereas the exit portion has a temperature of 250° C. As a result of this application of heat, the tube is dried and there is formed on its inside surface a coating layer of the polymer. The tube possesses after drying a residual water content of approximately 3% by weight, based upon the total weight of the tube.

The surface of the tube is then sprayed with an amount of water calculated so that the water content of the tube after treatment is approximately 14 to 16% by weight, based upon the total weight of the tube. The tube contains approximately 22% by weight of glycerine as a plasticizing agent, again based on the total weight of the tube.

The tube is very flexible and may be used advantageously for the production of synthetic sausage casings. The coating on the inside surface of the tube has a thickness corresponding to a surface weight of 7.2 g. of dispersed material per square meter of tube surface. The coating exhibits a water vapor permeability of only 0.8 $g/m^2$. 24 h, as well as an oxygen permeability of only 10 $c^3/m^2$. 24 h. bar. A sample of this tube is boiled for 20 hours in hot water, and after this period of time the coating layer is not dissolved from the tube. Another section of the tube is exposed for 20 minutes to the effect of hot water at 80° C. As a result, the original transparency of the coating remains unchanged.

After a storage period of 4 weeks following preparation of the tube, the tube is subjected to shirring with a conventional apparatus, to produce a shirred casing. Even after a lengthy storage period for the shirred casing, no decrease in quality of the tube from which it is formed as a result of breaks in the coating on the inner wall of the tube occurs.

EXAMPLE 2

In accordance with the procedure of Example 1, a cellulose hydrate-based tube is produced and after treatment with a regenerating liquid, a wash liquid and also a liquid containing a plasticizer, it is dried. The original inside surface of the tube is provided with a layer of synthetic material in accordance with the method described in Example 1. There is used as the coating solution a liquid composition which is comprised of 26.5 l. of water, 450 ml. of a 59% by weight aqueous solution of a melamineformaldehyde precondensate and 0.5 l. of glycerine. The tube is then passed through a 50 m. long drying channel provided with warm air at a temperature in the range from 90° and 120° C., and is simultaneously blown up and expanded by means of supporting air (tube diameter=60 mm.).

After exiting from the dryer, the cellulose hydrate tube with its inside surface coated is adjusted to a water content of from 8 to 10% by weight by wetting it with water and is rolled up on a roller. Following a three day storage period at a temperature in the range between 20° and 25° C. and at a relative humidity of between 55 and 60%, a surface coating layer is applied to the inner surface of the tube. Application of the surface coating is carried out in a convention manner in a dryer, which is comprised of an ascending portion and a descending portion and has a reversing roller in the upper part. In front of the entrance and subsequent to the exit of the device, there is positioned a pair of squeeze rollers. To accomplish the coating, there is introduced into the section of the tube between the two pairs of squeeze roller approximately 8 to 9 l. of an aqueous solution containing 6.5% by weight of a copolymer comprised of 88% by weight vinylidene chloride, 3% by weight acrylic acid, 1.5% by weight acrylic acid methyl ester and 7.5% by weight acrylonitrile. The dispersion also contains 4% by weight glycerine and 10 ml. of a silicone-based anti-foaming agent per 100 l. of dispersion. The weight percentiles given above are based respectively upon the total weight of the copolymer and where appropriate upon the total weight of the copolymer dispersion.

The tube is introduced into the dryer in such a manner that the dispersion is located subsequent to the pair of squeeze rollers at the entrance. The pair of squeeze rollers at the exit is open, and the tube is blown up to a diameter of 60 mm. by pressurized air. Thereafter, the tube is led through the dryer at a speed of 10 m./min., whereby the dryer is at a temperature of 560° C. at its entrance portion and at a temperature of 220° C. at its exit portion. After leaving the dryer, the tube is adjusted to a water content of from 16 to 18% by weight, based upon the weight of the tube, by means of the application of water. The tube is then rolled up on a roller.

Following a storage period of three days at a temperature of 20° to 25° C. and at relative humidity of 55 to 60%, the tube is cut into sections of approximately 16 to 18 m. in length. These tube sections are then subjected to the shirring process in conventional fashion by means of a known shirring device, in order to form the well known shirred casings. The tube utilized to form the shirred casing does not undergo any detrimental change as a result of mechanical action during the shirring procedure upon either the tube itself or its coating, even after extensive storage periods for the shirred casings. In other words, the creases formed during shirring do not cause breaks in the polymer coating.

EXAMPLE 3

A tube is prepared in accordance with the procedure set forth in Example 2 except that it is produced from a chemically modified cellulose hydrate in the form of a reaction product between cellulose hydrate and stearylamidebisdimethylene-triazinone-tetramethylol (7% by weight based upon the weight of cellulose hydrate). After drying this tube, the same is provided on its original inside surface with an adhesive layer of synthetic material as specified in Example 2. The application of the adhesive layer is accomplished in accordance with the process conditions set forth in Example 1. The tube is again dried following coating of the inside surface, in accordance with the conditions specified in Example 1.

The tube is characterized by the following properties:

| Properties | Tube with Stearyl-amide-bisdimethylene-triazinone-tetra-methylol-content | Tube of Cellulose hydrate and conventional plasticizer. |
| --- | --- | --- |
| Tearing length, longitudinally | 3,400 m | 3,000 m |
| tearing length, transversely | 3,075 m | 2,900 m |
| Tearing elasticity, longitudinally | 29 % | 24 % |
| Tearing elasticity, transversely | 36 % | 32 % |
| weight per m$^2$ | 90 g | 90 g |
| Swelling value, immediate | 119.3 % | 136 % |
| Swelling value after 7 months | 119 % | 116 % |

The tube made of chemically modified cellulose hydrate shrinks only very little during storage for an extensive period of time, even following pretreatment and drying of the same, i.e., the structure formation is already at an end at the time the tube leaves the dryer.

The tube is then provided with an interior coating with an aqueous, vinylidene chloride-containing copolymer dispersion having the characteristics described in Example 1, and the coating treatment is carried out according to the steps set forth in that example. After exiting from the dryer, the tube is brought to a water content of 17% by weight, based upon the total weight of the tube, by wetting with water, and then it is rolled up onto a roller. This tube can be subjected to the shirring procedure immediately following its production, without the result that the shirred casing obtained by gathering the tube contains defects as a result of the influence of mechanical forces on the tube during the shirring procedure, even if the tube is subjected to long periods of storage. It is advantageous, however, if the tube is not subjected to the shirring procedure until after a storage period of from about 1 to 2 hours. The increased flexibility of the tube facilitates the shirring procedure. The resulting tube possesses a coating layer having a thickness corresponding to a weight of 10 g. of polymer per square meter of tube surface. Its water vapor permeability corresponds to a value of 1.3 g./m$^2$·24 h, and its oxygen permeability has a value of 15 cm$^3$/m$^2$·24 h·bar.

The coating layer does not separate from its base following boiling of the tube for 20 hours in water. The shirred casings produced from the tube are easily processed without difficulty upon conventional sausage filling machines.

EXAMPLE 4

A tube is produced as in Example 1, except that the tube is prepared from a chemically modified cellulose hydrate which is a reaction product between cellulose hydrate and stearylamine-bisdimethylene-triazinone-tetramethylol (8% by weight, based upon the weight of cellulose hydrate). The coating layer described in Example 1 is then applied in the same manner described in that example. The resulting tube has the same values for water vapor and oxygen permeability as given in Example 1.

Behavior under shirring conditions:

A tube prepared according to this example, which is subjected to the shirring process immediately after its preparation, does not show any breaks in the coating layer, even after considerable periods of storage.

EXAMPLE 5

The procedure of Example 4 is followed, except that the coating layer is comprised of a mixture of copolymers in the ratio of 4:1. The first copolymer is comprised of 90% by weight of vinylidene chloride, 1% by weight of acrylic acid and 9% by weight of acrylic acid methyl ester, and the second copolymer is comprised of 85% by weight vinylidene chloride, 2% by weight acrylic acid, 6% acrylic acid methyl ester and 7% by weight of acrylic acid butyl ester. The coating on the inside surface of the tube has an elasticity of 18%. Following preparation of the foregoing tube, it is subjected to a storage period of 4 weeks. When the tube is gathered to form a shirred casing subsequent to the storage period, the resulting product may be stored for an indefinite period of time without exhibiting breaks in the coating layer.

EXAMPLE 6

The procedure of Example 4 is followed, except with the deviation that the tube is comprised of a reaction product of cellulose hydrate and stearylamidebis-dimethylene-triazinone-tetramethylol (8% by weight based upon the cellulose hydrate).

EXAMPLE 7

The procedure of Example 5 is followed, except that the tube is produced from a chemically modified cellulose hydrate as described in Example 6.

In those examples according to which the copolymer coating layer is applied to the inner surface of a tube which is present in a gelled condition and is comprised of a chemically modified cellulose hydrate, the material forming the tube contains the chemical cross-linking agent named respectively in the examples in an amount of from about 6 to 8% by weight based upon the weight of cellulose hydrate.

The adhesive layer or primer may be composed of:
(a) urea-formaldehyde precondensates,
(b) melamine-formaldehyde precondensates,
(c) precondensates obtained by cocondensation of formaldehyde with urea and melamine,
(d) condensation products obtained by condensing epichlorohydrin with polyamide,
(e) reaction products obtained by reacting gelatine with formaldehyde or with organic, aliphatic and saturated compounds having at least two reactive groups that are able to react with gelatine and are preferably terminal.

The products forming the adhesive layer or primer are characterized in that they are still water-soluble when applied to the surface of the tube, however, are not able to penetrate into the tube wall.

The products forming the adhesive layer are made water-insoluble by drying the tube coated with the precondensates according to (a) to (e).

The precondensates according to (a) to (c) are known from U.S. Pat. Nos. 3,378,379; 2,595,935; 2,796,362 and 2,423,428.

The epichlorohydrin-polyamide primers are known from U.S. Pat. Nos. 3,743,521; 2,866,710; 3,378,379, U.S. patent application Ser. No. 281,926 and Canadian Pat. No. 974 442 or Belgian Pat. No. 834 242.

What is claimed is:

1. Process for the preparation of a sausage casing, comprising the steps of coating the inside surface of a tube comprised of cellulose hydrate with an adhesive priming layer of an organic, synthetic material; applying to said primed inside surface a layer of a vinylidene chloride-containing copolymer comprised of from about 86 to 90% by weight of vinylidene chloride and from about 10 to 14% by weight of a mixture of copolymerizable monomers comprised of a $\alpha,\beta$-unsaturated carboxylic acid selected from the group consisting of acrylic acid, methacrylic acid and mixtures thereof, an ester of said carboxylic acid selected from a group consisting of acrylic acid esters, methacrylic acid esters and mixtures thereof, and acrylonitrile, said copolymer having been produced by copolymerization of a mixture of said vinylidene chloride and said copolymerizable monomers, the refractive index of said copolymer being substantially independent of temperature between about 40° C. and 80° C. and a solution of said polymer in tetrahydrofuran having a concentration dependent relative viscosity according to curve A in FIG. 3; adjusting the moisture content of the coated tube to a predetermined value; aging the tube for a period of at least about 3 days; and longitudinally gathering the aged tube to produce a shirred tube.

2. The process as defined by claim 1, wherein said step of applying said layer of a vinylidene chloride-containing copolymer comprises contacting said tube with an aqueous dispersion of said copolymer.

3. The process as defined by claim 2, further comprising the steps of drying said tube after applying said adhesive priming layer and after applying said layer of copolymer.

4. The process as defined by claim 3, wherein said step of adjusting the moisture content of the coated tube comprises spraying the tube with water until said predetermined value is attained.

5. The process as defined by claim 1, wherein said step of applying said layer of a vinylidene chloride-containing copolymer comprises contacting the inside surface of said tube with an aqueous dispersion containing from about 4 to 8% by weight of a copolymer comprising from about 86 to 90% by weight vinylidene chloride, about 1 to 5% by weight acrylic acid and/or methacrylic acid, about 0.3 to 4% by weight of an ester of acrylic and/or methacrylic acid and about 1 to 8% by weight acrylonitrile.

6. The process as defined by claim 5, wherein said aqueous dispersion contains from about 5 to 7% by weight of said copolymer.

7. The process as defined by claim 5, wherein said copolymer comprises about 88% by weight vinylidene chloride, about 3% by weight acrylic acid, about 7.5% by weight acrylonitrile and about 1.5% by weight acrylic acid methyl ester.

8. Process for the preparation of a sausage casing, comprising the steps of:
coating the inside surface of a tube comprised of cellulose hydrate with a surface layer of a vinylidene chloride-containing copolymer, said cellulose hydrate being in a gelled condition and said vinylidene chloride-containing copolymer being applied directly to said inside surface in the form of an aqueous dispersion, said copolymer comprising from about 84 to 92% by weight of vinylidene chloride and from about 8 to 15% by weight of a mixture of copolymerizable monomers comprised of an $\alpha,\beta$-unsaturated carboxylic acid selected from the group consisting of acrylic acid, methacrylic acid and mixtures thereof, and an ester of said carboxylic acid selected from the group consisting of acrylic acid esters, methacrylic acid esters and mixtures thereof, a major portion of said monomer mixture being comprised of said ester, said copolymer having been produced by copolymerization of a mixture of said vinylidene chloride and said copolymerizable monomers, the refractive index of said copolymer being substantially independent of temperature between about 40° C. and 80° C.;
a 1% by weight solution of said copolymer in tetrahydrofuran having a specific viscosity of at least about 1.8 and a 2% by weight solution of said copolymer in tetrahydrofuran having a specific viscosity of at least about 3; adjusting the water content of the coated tube to a predetermined value; aging the coated tube; and gathering the aged tube to form a shirred tube.

9. The process defined by claim 8, wherein said copolymer comprises from about 84 to 92% by weight vinylidene chloride, from about 0.5 to 3% by weight acrylic acid and/or methacrylic acid and from about 9 to 12.5% by weight of an ester selected from the group consisting of the methyl-, ethyl-, or propyl-ester of acrylic or methacrylic acid and mixtures of said esters.

10. The process as defined in claim 9, wherein said copolymer comprises about 90% by weight vinylidene chloride, about 1% by weight acrylic acid and about 9% by weight acrylic acid methyl ester and a solution of said copolymer in tetrahydrofuran has a concentration dependent relative viscosity according to curve B in FIG. 3.

11. The process as defined by claim 8, wherein said vinylidene chloride-containing copolymer comprises a first such copolymer and a second such copolymer in a weight ratio between about 1:1 and 4:1, said first vinylidene chloride-containing copolymer comprising about 90% by weight vinylidene chloride, 1% by weight acrylic acid and about 9% by weight acrylic acid methyl ester and said second vinylidene chloride-containing copolymer comprising about 85% by weight vinylidene chloride, about 2% by weight acrylic acid, about 6% by weight acrylic acid methyl ester and about 7% by weight acrylic acid butyl ester.

12. The process as defined by claim 8, wherein said tube is formed of chemically unmodified cellulose hydrate and said aging step is carried out for at least about 4 weeks.

13. The process as defined by claim 8, wherein said tube is formed of a chemically modified cellulose hydrate and said aging step is carried out for at least about 1 week.

14. The process as defined by claim 13, wherein said chemically modified cellulose hydrate comprises a reaction product of cellulose hydrate and an alkylamine-bisdimethylene-triazinone-tetramethylol.

15. The process as defined by claim 14, wherein said alkylamine-bisdimethylene-thiazinone-tetramethylol comprises stearylamine-bisdimethylene-triazinone-tetramethylol.

16. The process as defined by claim 14, wherein the amount of said alkylamine-bisdimethylene-triazinone-tetramethylol is from about 5 to 15% by weight based upon the total weight of the cellulose hydrate.

17. The process as defined by claim 16, wherein said amount is between about 6 and 8% by weight.

18. The process as defined by claim 13, wherein said chemically modified cellulose hydrate comprises a reaction product of cellulose hydrate and an alkylamide-bisdimethylene-triazinone-tetramethylol.

19. The process as defined by claim 18, wherein said alkylamide-bisdimethylene-triazinone-tetramethylol comprises stearylamide-bisdimethylene-triazinone-tetramethylol.

20. The process as defined by claim 18, wherein the amount of said alkylamide-bisdimethylene-triazinone-tetramethylol is from about 5 to 15% by weight based upon the total weight of the cellulose hydrate.

21. The process as defined by claim 20, wherein said amount is from about 6 to 8% by weight.

22. The process as defined by claim 1, wherein said moisture content is adjusted to a value between about 16 and 18% by weight.

23. The process as defined by claim 8, wherein said moisture content is adjusted to a value between about 7% and 22% by weight.

24. The process as defined by claim 8, wherein said step of adjusting the moisture content of the coated tube comprises spraying the tube with water until said predetermined value is attained.

* * * * *